W. HANCOCK.
METHOD OF PROTECTING METALLIC WIRES AGAINST OXIDATION AND THE LIKE.
APPLICATION FILED JAN. 2, 1908.
910,674.  Patented Jan. 26, 1909.
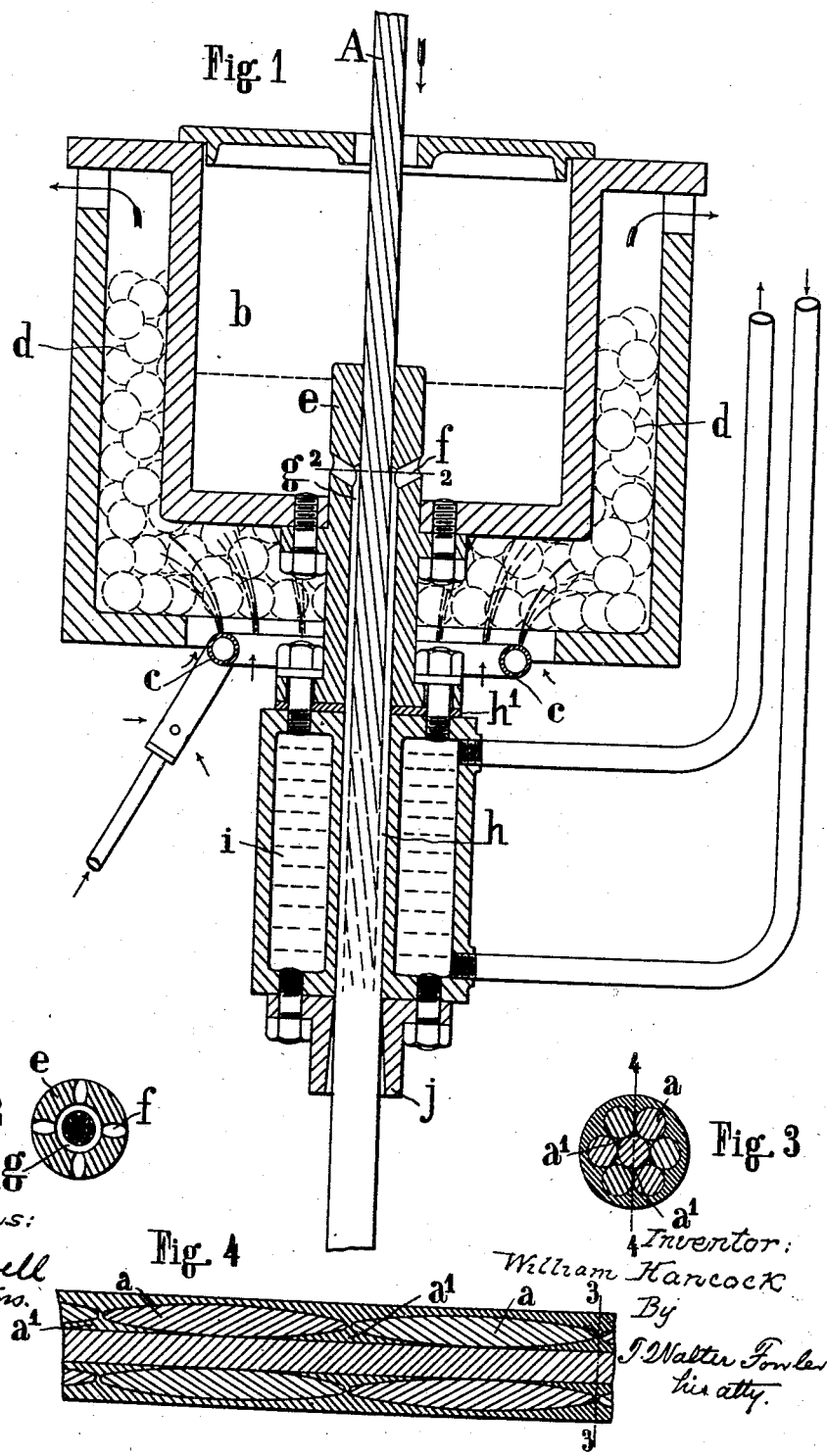

UNITED STATES PATENT OFFICE.

WILLIAM HANCOCK, OF CLIFTON, ENGLAND.

METHOD OF PROTECTING METALLIC WIRES AGAINST OXIDATION AND THE LIKE.

No. 910,674.

Specification of Letters Patent.

Patented Jan. 26, 1909.

Application filed January 2, 1908. Serial No. 408,927.

*To all whom it may concern:*

Be it known that I, WILLIAM HANCOCK, a subject of the King of England, and residing at 99 Woodland road, Clifton, Gloucestershire, England, engineer, have invented a certain new and useful Method of Protecting Metallic Wires Against Oxidation and the Like, of which the following is a full, clear, and exact description.
This invention relates to an improved method of protecting metallic wires from oxidation and other effects.

The invention is intended especially for the protection of stranded or other wires of iron or steel from rust and atmospheric influences and the improved wire treated by this method is applicable to the construction of lightning conductors, signal wires, fencing and the like.
It is well known that for purposes such as lightning conductors the use of stranded iron cable is advantageous if it can be protected from rust; this result I am enabled to attain in a thoroughly efficacious and permanent manner by means of the herein described method of protecting the stranded iron cable by a sheathing or matrix of lead in which the iron strands are also embedded.

The invention consists in the application to the wire *e. g.* a stranded iron wire, of a protective coating of lead or other non-rusting metal which is caused not only to form a sheathing around and outside the iron wire cable but also to enter the cable and surround the separate strands so that each individual strand is connected to and inclosed by the protecting metal and so that no interstices remain between the strands to serve for the accommodation of moisture and so cause internal rusting or corrosion.

The protecting metal may be applied to the wire in any desired manner, but in order to insure the perfect adherence of the coating I prefer to apply the same by drawing the cable through a bath of molten lead or the like, maintained at a suitable temperature. The metallic cable is with advantage previously tinned so that the iron and the lead may readily take to one another as in the ordinary operation of sweating or soldering. If desired also the cable may be treated with a suitable flux and lubricant, or either.

Upon the accompanying drawing I have shown in Figure 1 an apparatus for carrying out my invention; the view is one in sectional elevation. Fig. 2 is a sectional plan on line 2—2 of Fig. 1. Figs. 3 and 4 are cross and longitudinal sections respectively of the protected cable.

The cable A formed of tinned iron wires $a$, to a number of say seven strands, is well greased and passed over a guide roller into a container $b$ of molten lead, heated by any convenient means, such as a gas or other furnace, to a suitable temperature. I have illustrated a furnace comprising a gas ring $c$ with asbestos fuel $d$ placed around the container and serving to maintain a constant temperature. Within this container I arrange a mechanical guide $e$ fitting closely around the cable. Ports $f$ connect the container to an annular chamber $g$ within the guide $e$ where the lead being under pressure thoroughly permeates the stranded cable. If desired provision may be made for varying this pressure, *e. g.* by regulating the depth of the molten lead. In its passage through the metal the cable $a$ absorbs the lead which alloys with the tin coating upon the strands and completely fills the intervening spaces as shown at $a^1$.

The cable is withdrawn through the guide $e$ at the base of the chamber $b$ and as the cable passes out an annular space $h$ is left into which the lead flows so as to form an outer sheathing integral with the central matrix and firmly adherent to the stranded wire. The lower portion of this annular space $h$ may be furnished with a water-jacket $i$ to hasten the solidification of the leaden sheathing. In such case the jacketed portion may be insulated from the upper portion by an asbestos or similar washer $h^1$. The passage through which the protected cable is withdrawn may be slightly divergent, or a conical nozzle $j$ may be attached below the water-jacket.

Having thus described my invention what I claim as such and desire to secure by Letters Patent is:—

1. The method herein described of protecting stranded metal wires, said method consisting in feeding the wires in a substantially perpendicular direction and flowing protective molten metal upon the exterior of the stranded wires whereby the metal flows by gravity lengthwise of the wires and passes inwardly thereof and fills the interstices and forms a covering which entirely incases the separate strands.

2. A method of protecting stranded metal wires, which consists in feeding the stranded wires in substantially a perpendicular direction and coördinately flowing molten metal under pressure so that the said molten metal permeates said cable and fills the interstices between the said stranded wires.

3. A method of protecting stranded metal wire cables which have been previously coated with a material having an affinity for molten metal, said method consisting in feeding the wires in substantially a perpendicular direction and passing the cable through molten metal to form the exterior sheathing of the cable and in forcing the molten metal under pressure into the interstices between the stranded wires.

4. A method of protecting stranded wire cables, which consists in tinning the wires and passing the cable vertically down through a bath of molten metal and shielding the said cable from the metal in such manner that the metal reaches the cable only towards the bottom of the bath and thus under pressure, said metal being caused thereby to permeate the stranded cable and to fill the interstices as well as to sheathe the cable.

5. A method of protecting stranded wire cables, which consists in passing a previously tinned cable vertically down through a container of molten metal, partially shielding the cable from the metal in such a manner that the metal reaches the cable only towards the bottom of the bath and thus under pressure, said metal being thereby caused to flow substantially parallel to the length of the cable and to permeate said stranded cable, the cable thereafter passing through an annular chamber fed from the molten metal bath so as to sheathe the cable externally, and through a heat-abstracting chamber.

6. A method of protecting stranded wire cables which consists in tinning said wires and passing said stranded wires down through a bath of molten non-rusting metal, allowing said metal to reach said cable only at the bottom of said bath so that said metal is forced by the pressure according to its depth into the interstices between said strands, sheathing said cable exteriorly by passing it subsequently through an annular chamber supplied with molten metal, and afterwards through a heat abstracting chamber, said cable being maintained under tension.

7. An apparatus for protecting stranded wire cables comprising a container of molten metal, means for maintaining said container at the desired temperature, a guide in said container, ports in the said guide at about the bottom of the container to allow access of the fluid metal to the said cable, an annular chamber in said guide below said ports, a water jacket below and in continuation of the said chamber, a heat-resisting member between said jacket and said annular chamber, and means for drawing a cable under tension down said guide and through said chamber and said jacket.

In witness whereof I have hereunto set my hand in presence of two witnesses.

WILLIAM HANCOCK.

Witnesses:
E. M. TOLERTON,
E. J. FUSSELL.